No. 754,020. PATENTED MAR. 8, 1904.
C. J. SPRINGER.
ELECTRIC APPARATUS FOR MEASURING AND RECORDING
INTERVALS OF TIME.
APPLICATION FILED JUNE 27, 1903.
NO MODEL. 3 SHEETS—SHEET 1.

Witnesses:
Fred. E. Dorr.
F. B. Spaulding

Inventor:
Calvin J. Springer
by Teschemacher
Atty

No. 754,020. PATENTED MAR. 8, 1904.
C. J. SPRINGER.
ELECTRIC APPARATUS FOR MEASURING AND RECORDING
INTERVALS OF TIME.
APPLICATION FILED JUNE 27, 1903.
NO MODEL. 3 SHEETS—SHEET 2.

Witnesses:
Fred. E. Dorr.
F. B. Spaulding

Inventor:
Calvin J. Springer
by R. E. Teschemacher
Atty

No. 754,020. PATENTED MAR. 8, 1904.
C. J. SPRINGER.
ELECTRIC APPARATUS FOR MEASURING AND RECORDING
INTERVALS OF TIME.
APPLICATION FILED JUNE 27, 1903.
NO MODEL. 3 SHEETS—SHEET 3.
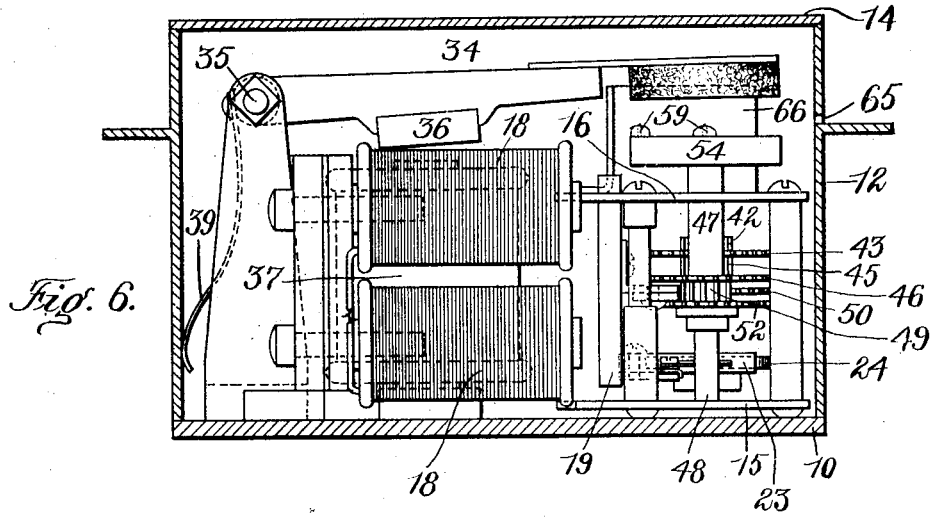
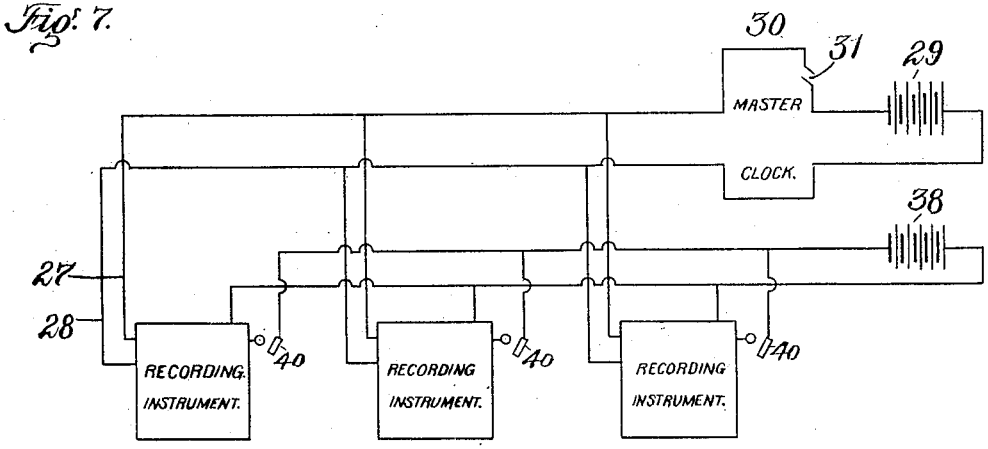
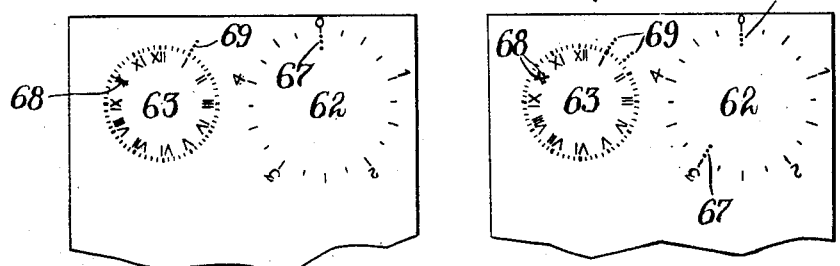
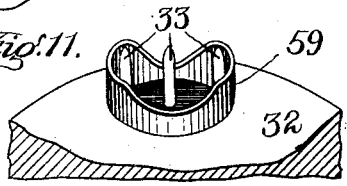
Witnesses:
Fred. E. Dorr.
F. B. Spaulding
Inventor:
Calvin J. Springer
by [signature]
Atty No. 754,020. Patented March 8, 1904.

UNITED STATES PATENT OFFICE.

CALVIN J. SPRINGER, OF SOMERVILLE, MASSACHUSETTS.

ELECTRIC APPARATUS FOR MEASURING AND RECORDING INTERVALS OF TIME.

SPECIFICATION forming part of Letters Patent No. 754,020, dated March 8, 1904.

Application filed June 27, 1903. Serial No. 163,379. (No model.)

*To all whom it may concern:*

Be it known that I, CALVIN J. SPRINGER, a citizen of the United States, residing at Somerville, in the county of Middlesex and State of Massachusetts, have invented certain new and useful Improvements in Electric Apparatus for Measuring and Recording Intervals of Time, of which the following is a specification.

My invention has for its object to simplify and improve the construction of machines or apparatus for measuring and recording intervals of time whereby a plurality of such machines may be electrically connected with and operated by a master-clock so arranged that it will close the electric circuit in which said machines are included to thereby simultaneously operate the time-trains of all of said machines at the close of each minute or portion thereof, so that each machine will be at all times ready to produce a record of the time indicated by the master-clock.

To this end my invention consists in the novel features of construction and combinations of parts hereinafter described and claimed.

Figure 1:
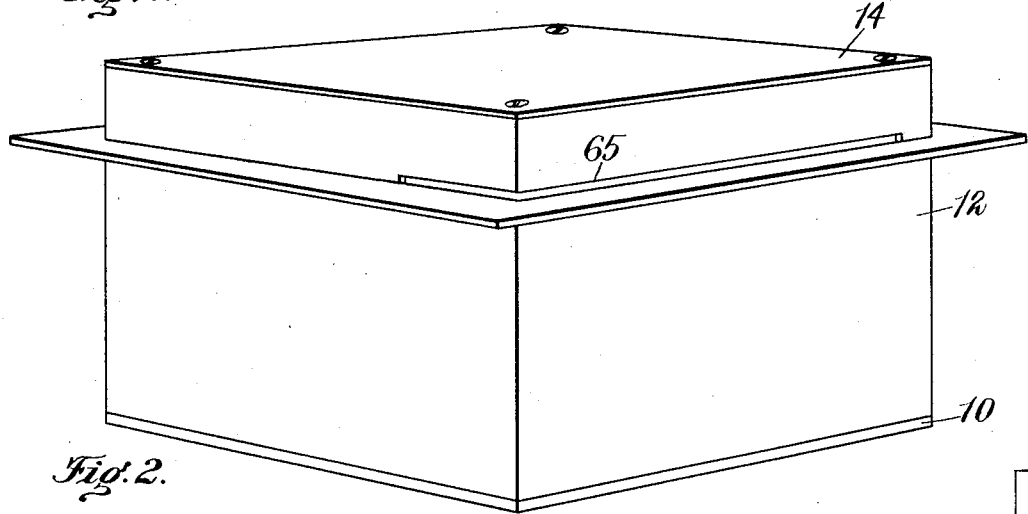
Figure 2:
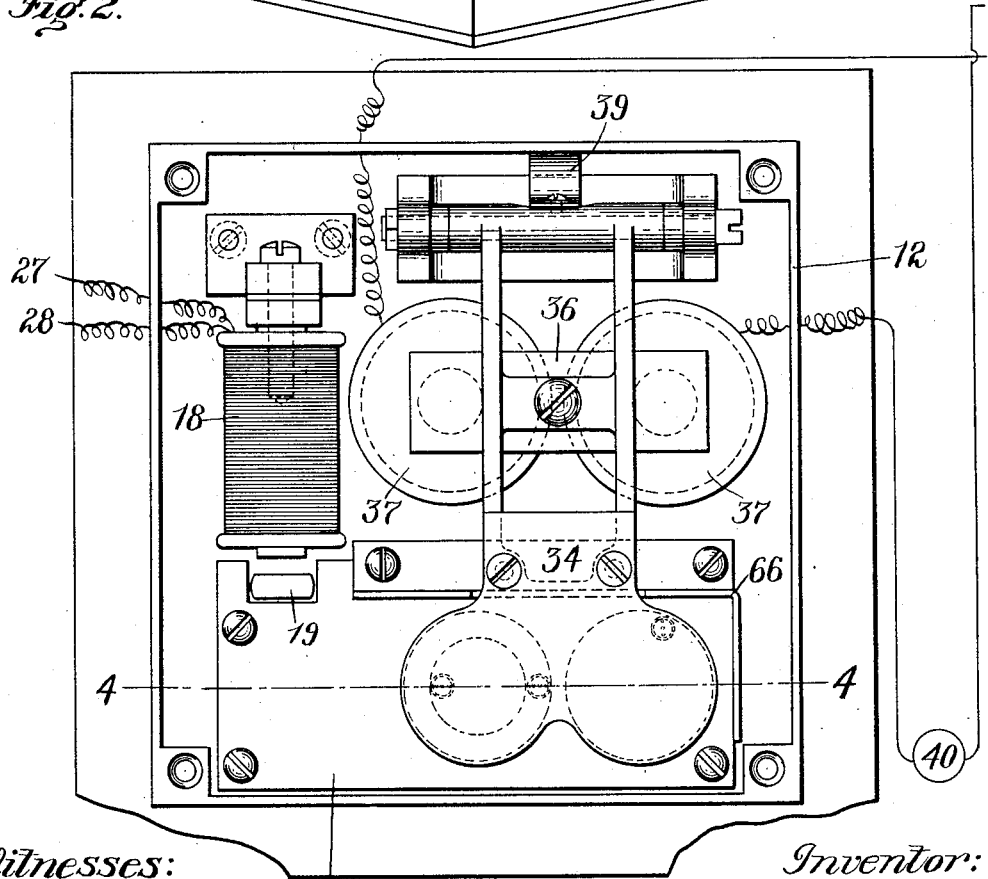
Figure 3:
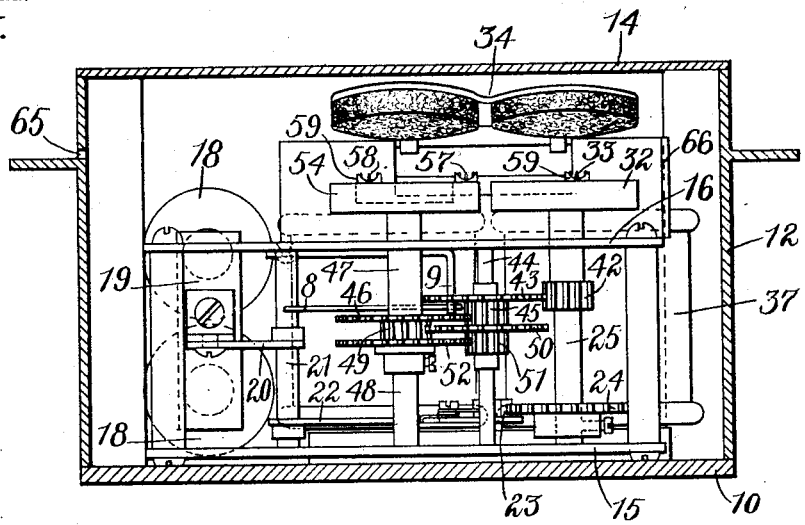
Figure 4:
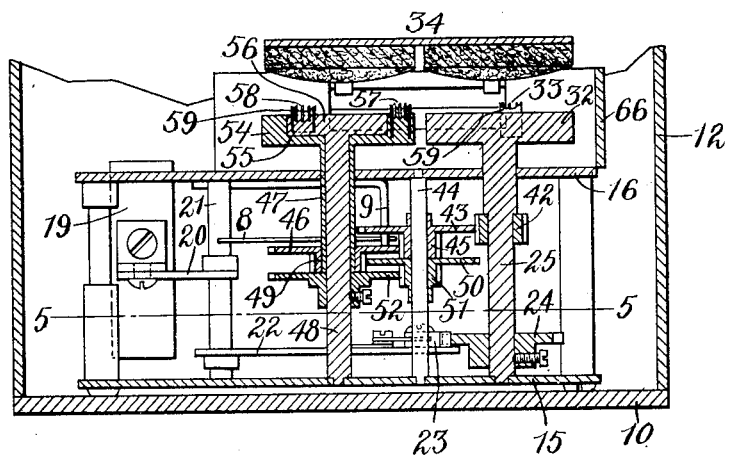
Figure 5:
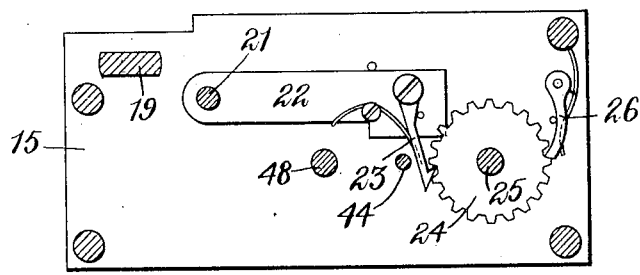
Figure 10:
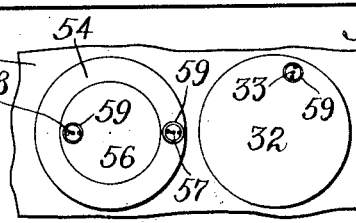

In the accompanying drawings, Figure 1 is a perspective view of my improved apparatus for measuring and recording intervals of time. Fig. 2 is a plan view of the same with the top plate removed. Fig. 3 is a front elevation of the same with the casing in section. Fig. 4 is a vertical section of the same on the line 4 4 of Fig. 2. Fig. 5 is a horizontal section of the same on the line 5 5 of Fig. 4. Fig. 6 is an end view of the same with the casing in section. Fig. 7 is a diagram showing a plurality of my recording-machines electrically connected with a master-clock. Fig. 8 is a view of the printed time-card used in connection with my machine, showing the perforations made therein at the beginning of an interval to be recorded. Fig. 9 is a view of the same card after being perforated at the end of the interval of time to be recorded. Fig. 10 is a detail of the carriers and their ticket-puncturing devices. Fig. 11 is an enlarged detail in perspective of a portion of one of the carriers, showing the ticket-puncturing device thereon.

In the said drawings, 10 represents the metal base-plate which supports the operative parts of the mechanism, which are inclosed within a flanged casing 12, of suitable shape, secured to said base-plate and provided with a removable cover 14.

Secured to the base-plate 10 is a plate 15, between which and a similar plate 16 is a time-train by which the registering devices to be hereinafter described are driven. The time-train is intermittingly operated at regular intervals—in the present case, every fifteen seconds—by an electromagnet 18, the spring-pressed armature 19 of which is connected with an arm 20, secured to a vertical rocker-shaft 21, journaled within openings in the two plates 15 16 and carrying near its lower end a long horizontal arm 22, to the free end of which is pivoted a pawl 23, which engages a ratchet-wheel 24, mounted on a vertical arbor 25, forming a part of the time-train. The pawl 23 has a spring to press it into engagement with its ratchet-wheel, and the latter is provided with a spring-pressed retaining-pawl 26, which prevents any backward movement of the ratchet-wheel 24 while the pawl 23 is being moved to take a fresh tooth. The armature 19 is attracted to the magnet against the influence of a spring 8, secured to and projecting laterally from the rocker-shaft 21 and having its free end extended through an opening in the downwardly-extending arm of a hanger 9, which is adjustably secured to the under side of the plate 16, whereby the tension of the spring 8 may be varied as desired.

27 28 are the circuit-wires of the magnet 18, which are connected with a suitable battery 29, Fig. 7, and included in this circuit is a master-clock 30, provided with a suitable circuit-breaker 31, adapted to be operated by the mechanism of said clock to close the circuit at regular intervals, whereby the time-train is caused to move in unison with the clock, so that the registering devices operated by said time-train will be at all times in readiness to produce on a time-card a record of an interval of time indicated by the master-clock, as hereinafter described.

To the upper end of the arbor 25 above the top plate 16 is secured a carrier 32, which may consist of either a disk, as shown, or a radial arm, if preferred. Projecting vertically from the upper surface of the carrier 32 near its edge is a puncturing device 33, consisting of a series of radially-arranged needle points or pins which are adapted to perforate a time-card when placed upon said carrier and pressed down thereupon by a movable platen 34, having an elastic or yielding face composed of felt, rubber, or other suitable material and acting as a hammer, said platen being hinged at 35 and carrying the armature 36 of an electromagnet 37, the circuit-wires of which are connected with a suitable battery 38, as shown in Fig. 7. The magnet 37 is energized to depress the platen against the resistance of a spring 39, Figs. 2 and 6, by operating a button or key 40, located at one side of the instrument, as shown in Fig. 2.

To the arbor 25 is secured a pinion 42, which meshes with a wheel 43, mounted loosely on a vertical arbor 44 and carrying a pinion 45, which meshes with and drives a wheel 46, fast on a tubular shaft or sleeve 47, revolving on a vertical arbor 48. The wheel 46 carries a pinion 49, which meshes with and drives a wheel 50, fast on the arbor 44 and carrying a pinion 51, which meshes with and drives a wheel 52, fast on the arbor 48.

To the upper end of the tubular shaft 47 above the plate 16 is secured a carrier 54, which may consist of either a disk, as shown, or a radial arm, if preferred. The carrier 54 is provided with a centrally-located recess 55, in which is fitted another carrier, 56, which may consist either of a disk, as shown, or a radial arm, if preferred, and is mounted upon the upper end of the arbor 48 and adapted to rotate within the carrier 54. The carriers 54 56 are each provided at or near the outer edge with a puncturing device 57 58, respectively, similar to the puncturing device 33 of the carrier 32, and each of these puncturing devices is encircled by an elastic element 59, preferably composed of a short section of rubber tubing notched at the upper edge and acting as a clearer to force the time card or ticket off the perforating pins or needle-points when the platen 34 is raised by its spring 39, Figs. 2 and 6, after being operated by the magnet 37 to press said time-card down upon said perforating devices. The carrier 54, with its puncturing device 57, as rotated by the time-train makes a complete revolution in one hour in unison with the minute-hand of the master-clock, while the inner carrier 56, with its puncturing device 58, makes a complete revolution in twelve hours in unison with the hour-hand of the master-clock, so that the relative position of the two perforating devices will correspond at all times to the position of the hands of the master-clock by which they are controlled.

The time-card (shown in Figs. 8 and 9) employed in connection with the herein-described machine instead of being printed by die-dials forming a part of the machine, as has heretofore been done in instruments for recording intervals of time, has printed upon it before being used two dials 62 63. The dial 62 has twenty equal divisions, representing quarters of a minute, and bears the numbers "0" to "4" to indicate five minutes. The other dial, 63, is marked off into twelve numbered divisions corresponding to the dial of a timepiece to indicate hours and minutes. The dials are so printed upon the time-card that when it is inserted through a slot 65 in the top of the casing printed side uppermost and placed squarely up against a rectangular gage-plate 66, Figs. 2, 3, 4, and 6, in position for recording the dials 62 63 will respectively overlie and register with the carriers 32 and 56, so that when the operator closes the circuit of the magnet 37 by means of the key or button 40 to thereby cause the platen 34 to press the time-card down upon said carriers the puncturing device of the carrier 32 will produce a series of radial perforations 67 inside of the line of the divisions of the minute-dial 62, thus producing within a quarter of a minute a record of the time when the ticket was perforated, while the puncturing devices 57 58 of the carriers 54 56, corresponding, respectively, to the minute and hour hands of the master-clock, will simultaneously produce on the clock-dial 63 of the time-card two series of radial perforations 68 69, one on the circle of figures on said dial and the other on the outside of said circle, the series on the circle of the dial-figures produced by the pins 58 marking the hour and the outside series produced by the pins 57 marking the minutes, thus recording the time of day when the perforations were made by operating the platen 34.

Fig. 8 represents a time-card on which a record has been made at the commencement of an interval of time to be measured, showing on the imprint of the clock-dial thereon the time to be five minutes past ten, at which time the perforations were made on the minute-dial 62 in juxtaposition with the zero thereon, and Fig. 9 represents the same card at the termination of the interval of time to be measured, showing on the clock-dial the time to be eight minutes past ten, with the second line of perforations on the minute-dial 62 at the numeral "3" thereon, an interval of three minutes being thus recorded.

Fig. 7 represents a plurality of the above-described recording instruments electrically connected with a master-clock included in the same circuit. If desired, any number of these instruments may be included in a single circuit with the master-clock, so that the time-trains of all the instruments will be simultaneously controlled by said master-clock—as, for instance, in a telephone-exchange, where a great number of recording instruments are constantly in use.

Among the many advantages incident to my invention may be enumerated the following: By the employment of a time-card having dials printed thereon previous to its use and preforating the same opposite to figures or marks upon said dials instead of using printing-dies forming a part of the mechanism of the recording instrument, as heretofore, I am enabled to dispense with an inking-ribbon, and thus effect a material saving and at the same time greatly simplify the mechanism. By operating the time-trains of a plurality of recording instruments simultaneously by means of electromagnets controlled by a master-clock instead of spring-operated clockwork, as heretofore, no winding up is required, which in the case of a large number of machines involves the waste of considerable time. By operating the platen by an electromagnet instead of by a hand-lever, as heretofore, in connection with the perforating devices described, a perfectly clear and distinct record is always made, thus avoiding mistakes, while with an inking-ribbon and printing-dies operated by a hand-lever, as heretofore, a faint impression is often made, which is a very serious objection and often leads to mistakes and disputes.

What I claim as my invention, and desire to secure by Letters Patent, is—

In a machine for measuring and recording intervals of time, the combination with a time-train adapted to be actuated by an electromagnet controlled by a clock, of a rotatable carrier driven by said time-train and provided with a puncturing device adapted to produce a record of minutes and portions thereof on a card or ticket bearing the imprint of a minute-dial, two rotatable concentrically-arranged carriers also driven by said time-train at different velocities and each provided with a puncturing device for puncturing a card or ticket bearing the imprint of a clock-dial to record on said dial the time of day corresponding to that indicated by the controlling-clock, and a movable platen or hammer adapted to be operated by an electromagnet for pressing the time card or ticket upon said puncturing devices.

Witness my hand this 20th day of June, A. D. 1903.

CALVIN J. SPRINGER.

In presence of—
P. E. TESCHEMACHER,
F. B. SPAULDING.